(12) United States Patent
Watermann et al.

(10) Patent No.: US 11,026,014 B2
(45) Date of Patent: Jun. 1, 2021

(54) METHOD FOR OPERATING AT LEAST ONE MOBILE RADIO DEVICE, POWER SUPPLY UNIT FOR MOBILE RADIO DEVICE, CHARGER AND AUDIO TRANSMISSION CONFIGURATION SYSTEM

(71) Applicant: Sennheiser electronic GmbH & Co. KG, Wedemark (DE)

(72) Inventors: Jan Watermann, Hannover (DE); Sebastian Georgi, Langenhangen (DE); Axel Schmidt, Wedemark (DE); Andreas Stefan Wilzeck, Gehrden (DE)

(73) Assignee: Sennheiser electronics GmbH & Co. KG, Wedemark (DE)

( * ) Notice: Subject to any disclaimer, the term of this patent is extended or adjusted under 35 U.S.C. 154(b) by 0 days.

(21) Appl. No.: 16/654,127

(22) Filed: Oct. 16, 2019

(65) Prior Publication Data
US 2020/0128318 A1  Apr. 23, 2020

(30) Foreign Application Priority Data
Oct. 17, 2018  (DE) .......................... 102018125714.7

(51) Int. Cl.
*H04R 1/22* (2006.01)
*H02J 7/00* (2006.01)

(52) U.S. Cl.
CPC ................. *H04R 1/222* (2013.01); *H02J 7/00* (2013.01); *H02J 7/0042* (2013.01)

(58) Field of Classification Search
CPC ............ H04R 1/222; H02J 7/00; H02J 7/0042
See application file for complete search history.

(56) References Cited

U.S. PATENT DOCUMENTS

2013/0002442 A1*  1/2013  Guthrie ............... H01M 10/488
340/636.1

* cited by examiner

*Primary Examiner* — Andrew L Sniezek
(74) *Attorney, Agent, or Firm* — Haug Partners LLP

(57) ABSTRACT

A method for operating at least one mobile radio device that includes a transmitter, a slot for receiving a power supply unit, and a control unit for controlling operation of the transmitter depending on the radio parameters and/or configuration data. Radio parameters and/or configuration data are transferred to a memory of the power supply unit. The power supply unit is inserted into the slot. Operation of the transmitter is controlled by the control unit based on the radio parameters and/or configuration data that are stored in the power supply unit.

25 Claims, 2 Drawing Sheets

METHOD FOR OPERATING AT LEAST ONE MOBILE RADIO DEVICE, POWER SUPPLY UNIT FOR MOBILE RADIO DEVICE, CHARGER AND AUDIO TRANSMISSION CONFIGURATION SYSTEM

The present application claims priority from German Patent Application No. 10 2018 125 714.7 filed on Oct. 17, 2018, the disclosure of which is incorporated herein by reference in its entirety.

FIELD OF THE INVENTION

The present invention relates to a method for operating at least one mobile radio device, a power supply unit for a mobile radio device, a corresponding charger and an audio transmission configuration system.

BACKGROUND

Portable or mobile radio devices such as e.g. wireless microphones or wireless In Ear monitors are operated with particular radio parameters, such as e.g. transmission power and transmission frequency. Further, such mobile radio devices must have a transmission/reception license. In this way, the validity period of the license, the licensed frequency and a licensed frequency range are defined. Thus, the mobile radio devices must be configured by setting the predefined radio parameters for their operation to be smooth. For this purpose, e.g. their transmission power and transmission frequency must be set.

SUMMARY OF THE INVENTION

It is an object of the present invention to provide a method for operating at least one mobile radio device that enables an improved handling of the radio device at the start of operation. In particular it is an object of the present invention to enable an improved possibility of configuration of a mobile radio device.

The invention is related to the idea of simplifying a configuration process of mobile radio devices such as e.g. wireless microphones and pocket transmitters or plug-on transmitters, respectively. Plug-on transmitters may be plugged on e.g. cameras or consoles such as mixing consoles, and may be used e.g. for the control of wireless In-Ear monitors. According to the invention, the radio parameters required for operating the mobile radio device are stored in advance in a memory of an accumulator or of a battery pack for the mobile radio device. When a power supply unit such as e.g. an accumulator unit or a battery pack is inserted into the mobile radio device, the mobile radio device reads the radio parameters or configuration data respectively that are stored in the memory and is adjusted to the corresponding radio parameters or configuration data respectively, in particular before the mobile radio device starts transmission.

According to an aspect of the present invention, the required radio parameters or configuration data are not transmitted e.g. wirelessly any more to the mobile radio device, but in a wired manner indirectly via the power supply unit, e.g. the accumulator or the battery pack.

According to an aspect of the present invention, a charger for the accumulator unit is provided that stores the radio parameters or configuration data into the memory of the accumulator unit while the accumulator unit is connected to the charger or being charged or inserted in the charger. Thus, the charger then not only has a charging function but also serves for transferring the radio parameters or configuration data respectively.

According to an aspect of the present invention, a battery pack with a memory can be used as power supply unit, instead of an accumulator unit. Such battery pack does not comprise rechargeable accumulators, but serves for accommodating commercially available batteries. Nevertheless, the battery pack may then be inserted into the charger, since the charger and/or the battery pack detects that there are no rechargeable accumulators within the battery pack, so that no recharging occurs but only a transfer of the radio parameters and/or configuration data.

The method for operating at least one mobile radio device according to the invention thereby ensures that the mobile radio device already at power-up has correct radio parameters and/or configuration data available, and does not transmit based on impermissible settings. This may ensure that the mobile radio device never transmits outside the approved radio parameters. Moreover, the radio parameters or configuration data respectively may comprise at least one time indication, such as a date, a time of day or a duration, for allowing (transmit) operation dependent from the time indication.

According to an aspect of the present invention, the mobile radio device does not start up until it has received the required radio parameters or configuration data. These are transferred in a wired manner to the mobile radio device by using the accumulator unit or a battery pack.

Using the accumulator unit or a battery pack for transferring the radio parameters or configuration data is particularly advantageous because the mobile radio device cannot be operated without the accumulator unit or battery pack being inserted, since the accumulator unit or battery pack respectively supplies the energy required for operating the mobile radio device. Therefore, the configuration cannot be forgotten.

According to an aspect of the present invention, the accumulator unit or the battery pack may be removable or fixed in the mobile radio device. If the accumulator unit or battery pack is removable, it may be removed from the mobile radio device and placed in the charger for recharging the accumulator unit and transferring the radio parameters and/or configuration data. If the accumulator unit is not removable, the mobile radio device as a whole may be connected to or placed in the charger for recharging the accumulator unit and transferring the radio parameters and/or configuration data.

According to an aspect of the present invention, the radio parameters and configuration data stored in the memory of the accumulator unit or battery pack may be read out from the memory and stored in a memory of the mobile radio device. Alternatively, the radio parameters and/or configuration data can be used directly after being read from the memory of the accumulator unit or battery pack, so that no extra memory in the radio device is required for storing the radio parameters or configuration data.

According to an aspect of the present invention, the accumulator unit and/or the mobile radio device has a display that may show the configuration data or a configuration state of the accumulator unit or the mobile radio device.

According to an aspect of the present invention, the charger may be connected to a computer or server for recharging the accumulator unit and for transferring the configuration data. On the computer or server, management software may be run that supervises, controls and determines the assignment of the radio parameters or configuration parameters to the mobile radio devices to be used. By means of the management software, the radio and configuration parameters of the respective mobile radio devices are defined. This is based in particular on a location of operation, a duration of operation, the number of utilized mobile radio devices etc. The management software ensures that the mobile radio devices are always operated with centrally specified and therefore valid radio parameters at any time, and that the mobile radio devices always have a corresponding valid radio license for transmitting and/or receiving.

Further embodiments of the invention are subject of the dependent claims.

BRIEF DESCRIPTION OF THE DRAWINGS

Advantages and embodiments of the invention will be described in the following with reference to the drawings.

DETAILED DESCRIPTION OF THE INVENTION

Figure 1:
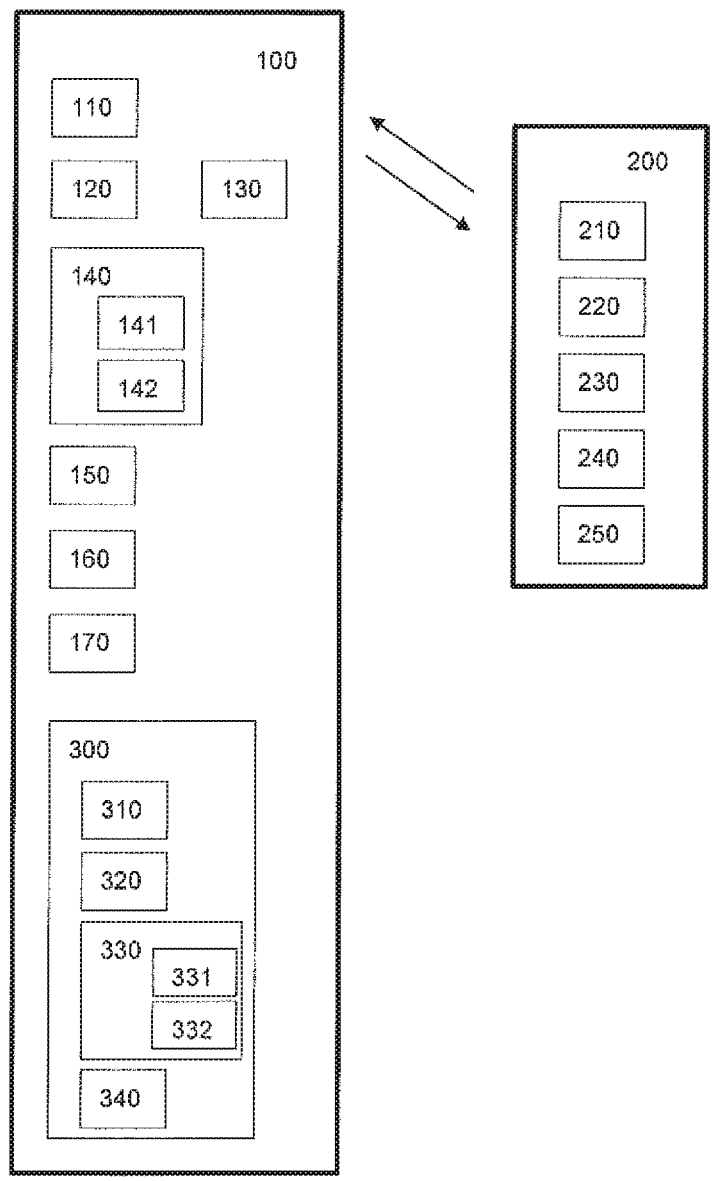
FIG. 1 shows a block diagram of a mobile radio device according to a first embodiment.

FIG. 1 shows a block diagram of a mobile radio device 100 and a corresponding base station 200. The mobile radio device 100 comprises a wireless transmitter 110, a microphone capsule 120 (if the radio device is a wireless microphone) or an audio input 130 (if the radio device is a pocket transmitter or plug-on transmitter e.g. for a wireless in-ear monitor). The mobile radio device 100 further has a slot 140 or connector 140 for receiving a power supply unit 300. The connector 140 may have electrical terminals 141 for power supply and electrical terminals 142 for data transmission. However, it is also possible that the power supply and the data connection use common connectors, e.g. the data may be modulated onto the supply current. The mobile radio device 100 further has a controller or control unit 150 for controlling the transmitter 110 based on the received configuration data and/or radio parameters.

The mobile radio device 100 has optionally a display 160 and a rewritable first memory 170 for storing radio parameters and/or configuration data.

The mobile radio device 100 may further be connected to at least one power supply unit 300, such as e.g. an accumulator unit 300, for power supply. E.g. may the power supply unit 300 be receivable in a slot 140. The power supply unit 300 or the accumulator unit 300 respectively has at least one accumulator 310, a rewritable second memory 320 for storing radio parameters and/or configuration data, and electrical connections 330 for transmitting energy and as a data interface. The electrical connections 330 may comprise first electrical connections 331 for power supply and second electrical connections 332 for data transfer, which are connectable to the terminals 141, 142 of the mobile radio device, respectively. At the mobile radio device 100, and likewise at the accumulator unit 300 and at a charger for the accumulator unit, there may be separate electrical connections, or the connections for power supply may be shared for the data transfer. Optionally, the accumulator unit 300 may comprise a display 340 for displaying radio parameters or configuration data.

The mobile radio device 100 may communicate with a base station 200 by means of the transmitter 110. The transmitter 110 may also be part of a combined transmit/receive module. The base station 200 has a transmitter 210, a receiver 220, a third memory 230, an audio output 240 and a data interface 250. By means of the transmitter 210 and the receiver 220, the base station 200 may communicate with the mobile radio device 100. In particular, audio data or audio signals may be transmitted from the mobile radio device to the base station 200. In the third memory 230, the radio parameters and configuration data of the mobile radio device that must be known in the base station 200 may be stored. These data may either be wirelessly transferred from the mobile radio device, or the radio parameters or configuration data may be transferred via the data interface 250 to the base station. The data interface 250 may be connected, e.g. via a local network, to a computer on which a management software is running. This may ensure that the base station knows the radio parameters and configuration data of the mobile radio device 100, so that a transmission is possible.

Figure 2:
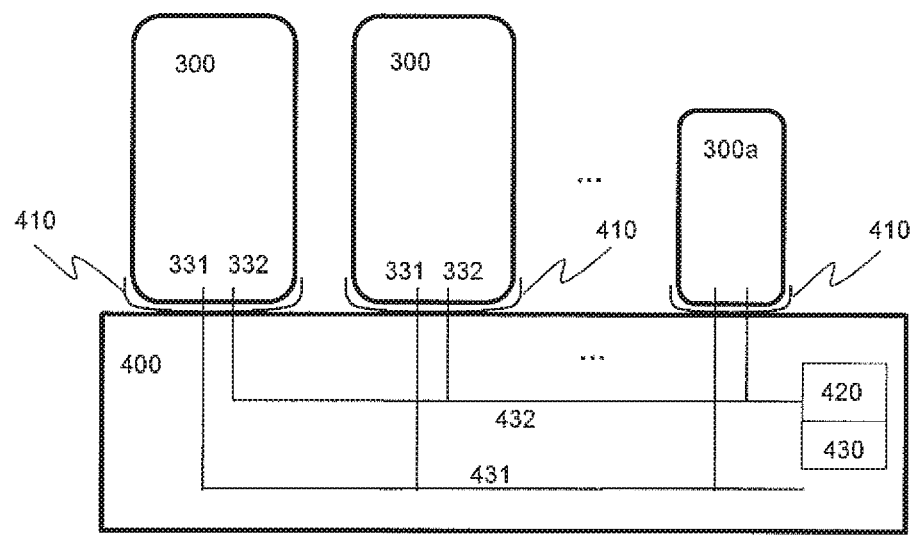
FIG. 2 shows a schematic representation of a charger according to a second embodiment of the invention.

FIG. 2 shows a schematic representation of a charger according to the invention. The charger 400 has one or more charging shafts 410 in each of which a power supply unit such as e.g. an accumulator unit 300 may be placed. Optionally, the charging shafts 410 may be configured so that a mobile radio device 100 with the accumulator unit 300 may be placed therein for recharging the accumulator unit 300 and transferring radio parameters and configuration data. In this case it is also possible to configure such radio devices in which the accumulator unit 300 is difficult or impossible to remove. In principle there may also be an electrical connection to which the accumulator unit 300 or the radio device with the accumulator unit contained therein may be connected for charging, instead of a charging shaft 410. Optionally, different types of power supply units or accumulator units 300, 300a respectively may be connected. Further, the charger 400 may have at least one configuration unit 420 for receiving the radio parameters and/or configuration data and transferring them to each accumulator unit 300 according to the invention that is connected to or placed in a charging shaft 410. In one embodiment, at least a portion of the data may be individually different for each accumulator unit 300, 300a. For this purpose, the charger 400 may distinguish between different accumulator units 300, 300a based on data already stored therein. Furthermore, in one embodiment the charger may have different modes of operation, wherein in one mode a portion of the data already stored in the accumulator unit 300, 300a is not overwritten, but maintained, e.g. a name of a user. Optionally, the charger may have separate electrical connections for the power supply 431 and the data transfer 432, as described above. The configuration unit 420 may receive the radio parameters and/or configuration parameters e.g. via a wireless connection, via a network connection, via its supply power or via a user interface. It may be implemented e.g. by a configurable processor. Further, in one embodiment the radio parameters and/or configuration data may be encrypted by an encryption unit 430 before being transferred to the accumulator unit 300, 300a. The encryption unit 430 may be a separate unit or part of the configuration unit 420. As mentioned above, also a battery pack according to the invention may be connected to the charger 400 for configuration, and then be configured in the same way as an accumulator unit.

Figure 3:
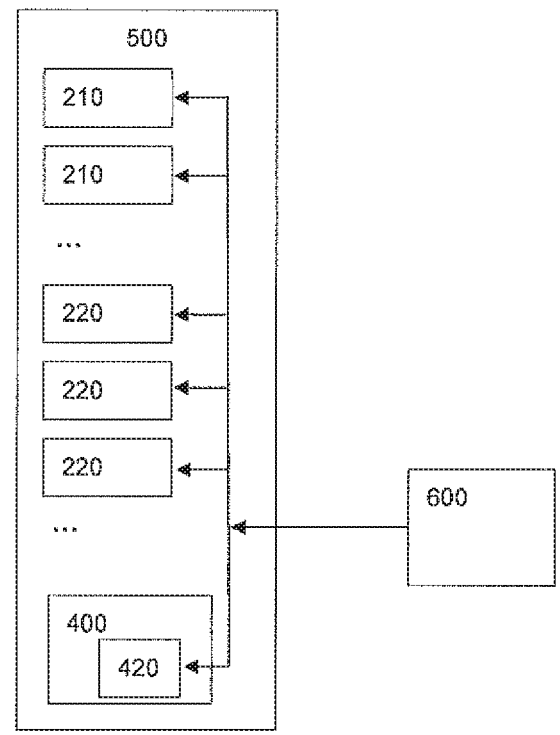
FIG. 3 shows a schematic representation of an audio transmission configuration system according to a third embodiment of the invention.

FIG. 3 shows a schematic representation of an audio transmission configuration system, according to a third embodiment of the invention. In a rack 500, a plurality of transmission and reception units 210,220 and, for example, a charger 400 may be provided. Optionally, the rack 500 may comprise a plurality of chargers 400. The transmission and reception units 210,220 as well as the charger 400 may be coupled to a computer or server 600. On the computer or server 600, a management software or a management method respectively may be implemented. The management method implemented on the computer or server 600 checks, controls and sets the radio parameters for the mobile radio devices 100. For this purpose, the respective radio parameters and configuration data are transferred from the computer or server 600 to the charger 400 as well as to the transmission and reception units 210, 220. The charger 400 may then transfer the respective radio parameters or configuration data to the power supply units, e.g. accumulator units 300, which are located in the charging shafts 410, so that the radio parameters and configuration data may be stored in the second memories 320 of the accumulator units. E.g., when the accumulator units are partly or fully charged, they may be inserted into the mobile radio devices 100, so that the mobile radio devices may be operated. Preferably, the radio parameters and configuration data are stored in the second memories 320 of the accumulator units immediately after insertion into the charger 400 or connection to the charger 400, respectively. Initially, an authentication may optionally be performed, in which the accumulator unit 300 identifies itself to the charger 400 with a specific identifier. At power-up of the mobile radio devices, the radio parameters and configuration data stored in the second memory 320 may be used for setting the transmitter 110 to the respective values. The transmitter 110 does not transmit until its configuration according to the radio parameters and/or configuration data is completed. This prevents the radio device from transmitting on a frequency that is not permitted at the respective location and/or time.

According to a fourth embodiment of the invention, a battery pack may be used alternatively to the accumulator unit 300 as power supply unit. The battery pack 300 has a memory 320 and electrical connectors 330. The battery pack 300 preferably has the same dimensions as the accumulator unit, so that the battery pack 300 may also be inserted into the charging shaft 410 of the charger 400. However, it must be ensured that the conventional batteries within the battery pack are not charged. Instead, only the radio parameters and configuration data are stored in the second memory 320.

The radio parameters and configuration data may comprise e.g. one or more of the following data: identification data (ID, an artist's name or an artist's number or any alphanumeric text), a configuration of application parameters like e.g. an audio gain of the microphone capsule, a configuration of radio parameters like e.g. transmission power and/or transmission frequency, and restrictions of input options available via the user interface (blocking of manual configuration, limitation of the frequency range according to a license permit). Further, temporal restrictions of the transmission functionality of the device based on the granted radio license (validity period of the license, timer, real time clock) may be provided. For example may the radio license be valid only on a certain date and/or until a certain time. The invention ensures that there is no need for the user to enter frequencies or time information manually, which would be error-prone and might lead to serious interference in radio operation. This provides security against possible misuse of the radio device.

In one embodiment of the invention, the power supply unit 300 comprises a timer that is set to a value included in the configuration data during or immediately after connection to the charger. The radio license is valid as long as the timer is running. The power supply unit can provide a corresponding "valid" signal to the radio device, which uses it for controlling its transmission operation. The radio license may apply to one or more frequencies defined in the radio parameters, which the power supply unit also provides to the radio device. After expiry of the timer, the radio device is not allowed to transmit at least on the respective frequencies. At most, transmission may then be possible on freely accessible frequencies. This has the advantage that if the license is bound to a date and/or a time, the actual time and the actual date need only be known to the charger that transfers the timer value to the power supply unit. However, the actual time and the actual date need neither be known to the power supply unit nor to the radio device. This simplifies the mobile radio device and may prevent input errors of the user. The charger may be cable-bound and therefore easily receive the current time and current date at the place of operation, e.g. via the Internet or a local network. This is advantageous particularly if the radio device (or the charger respectively) is used in different, i.e. varying time zones, like e.g. a wireless microphone on an international tour of several countries or continents.

In another embodiment of the invention, the power supply unit comprises a clock that is automatically set to the actual time and the actual date corresponding to the place of operation. The clock may be set e.g. by the charger by means of the configuration data or by wirelessly receiving the time/date information. In principle, a further variant would be possible, in which the radio device comprises a clock that is compared with values provided as configuration data to the power supply unit. The power supply unit then only serves to transport the configuration data. This however bears the risk that the time that is set at the radio device is not exactly correct, so that this variant is normally less favorable than the others.

The radio parameters and/or configuration data may comprise frequency regulatory (e.g. legal) requirements, like e.g. frequency ranges principally admissible in the respective country. They may also comprise requirements based on a radio license, which are usually a subset of the frequency regulatory requirements, i.e. limit these further. Various options and configuration parameter may be left open in order to allow a final configuration within the frequency regulatory requirements and the license. For example, the radio parameters and/or configuration data may be used to unlock or lock more or fewer configuration options (e.g. subranges of frequency regulatory requirements) at the radio device. Thus, the radio parameters and/or configuration data may comprise a plurality of alternatively usable transmission frequencies, transmission power values or ranges of transmission frequencies or transmission power values, and controlling operation of the transmitter comprises selecting a range or subrange of the plurality of alternatively usable ranges. The selected range or subrange is not modified during a time window according to the time indication, which has a length of at least several seconds or minutes and often several hours or days. Furthermore, the charging state and number of charging cycles of the accumulator unit's accumulators may be part of the configuration data stored on the accumulator unit. Optionally, the configuration data and/or a configuration status may be displayed via optical display elements, such as e.g. LEDs, on the accumulator unit.

The computer or server respectively 600 may assign the radio parameters and the required radio licenses based on information such as e.g. the position of the radio device, the number of radio devices to be used, radio parameters of other radio devices operated nearby as well as based on frequency restrictions.

In one embodiment, the first memory 170 or a further memory contained in the radio device comprises further configuration data, like e.g. the actual transmission frequency of the transmitter 110 as defined during frequency planning. These must be in conformity with the radio parameters and configuration data that were received from the charger 200 and that are also stored in the first memory 170. In this embodiment, after powering up, the radio device compares whether the radio parameters and configuration data stored in the memory 320 of the power supply unit 300 match the corresponding data stored in its internal first memory 170. If so, the transmitter 110 may start transmitting, taking into account also the other configuration data stored in the first memory 170. Otherwise, the latest configuration data are transferred from the second memory 320 of the power supply unit 300 to the first memory 170 before. The comparison may be done by the control unit 150 or by another control or comparison unit in the radio device. In a variant, the comparison of the radio parameters and/or configuration data in the first memory 170 of the radio device 100 with those of the second memory 320 of the power supply unit 300 can be accelerated by forming and storing checksums over the stored radio parameters and configuration data. At power-up, only the checksums are compared then. Upon a mismatch, the radio parameters and configuration data are loaded or copied from the second memory 320 to the first memory 170, as described above. In one embodiment, the invention concerns a recharging and configuration device, such as charger 200, as well as a method executed by the recharging and configuration device for automatically configuring a mobile radio device 100 that comprises a transmitter 110, a slot 140 for receiving a power supply unit 300 and a control unit 150 for controlling operation of the transmitter 110 as a function of radio parameters and/or configuration data. The method comprises the following steps. First, the recharging and configuration device receives e.g. via a network radio parameters and/or configuration data that come ultimately from an official central authority. If the recharging and configuration device 200 is connected to a mobile power supply unit 300, it transfers the radio parameters and/or configuration data to a memory 320 of the power supply unit 300. Beforehand, the recharging and configuration device may optionally determine the type of power supply unit 300, whether or not it comprises a memory and/or which data are already stored in the memory. If the recharging and configuration device detects that the power supply unit 300 comprises an accumulator 310, it may recharge the accumulator 310 while transferring the radio parameters and/or configuration data to the memory 320. In particular, the recharging and configuration device 200 in one embodiment may determine a remaining duration from data relating to a transmission license that it received as a part of the configuration data and that comprise a time or date, as well as a current time and date, and transfer the remaining duration to the memory 320, which may be part of a timer. If the power supply unit 300 is inserted into a mobile radio device 100, it enables a transmission operation of the mobile radio device for the remaining duration of the timer.

In one embodiment, the invention relates to a data storage device having stored thereon instructions for configuring a processor in a charging and configuration device to execute the method described above.

The solution according to the invention as described above is advantageous since it provides the mobile radio devices with the required radio parameters immediately after power-up or activation respectively, independent from a further interface such as infrared or radio, so that they can be operated according to the desired technical and frequency regulatory requirements. This can in particular avoid misconfiguration and any use of the radio devices outside the awarded radio licenses or the valid frequency regulations.

According to an aspect of the present invention, the radio parameters and configuration data stored in the second memory of the accumulator unit or battery pack respectively may be encrypted. The mobile radio device may then have a corresponding decryption unit for decrypting the data and before using them. This can prevent improper reprogramming of the accumulator units.

The accumulator unit or power supply unit 300 respectively is a module that mainly comprises an accumulator and is intended mainly for supplying current to another device. The transmission and reception unit 210,220 is a transmitter and receiver, respectively. The controller 150, configuration unit 420 and encryption unit 430 and decryption unit respectively may be implemented by processors configurable by software. The slot 140 is part of the mobile radio device 100 and may be a chamber or shaft.

The invention is advantageously usable for mobile radio devices, in particular wireless microphones, which are operated in various environments with different frequency regulatory requirements. Further limitations may be incorporated through licenses. In principle, the invention may also be used for mobile receiving devices that are operated in various environments with different frequency regulatory requirements, which possibly may also be further limited through licenses.

Of course, the different embodiments described above may be combined.

The invention claimed is:

1. A method for operating at least one mobile radio device, the mobile radio device comprising a transmitter, a slot adapted for receiving a power supply unit, and a control unit adapted for controlling operation of the transmitter as a function of radio parameters and/or configuration data, the method comprising steps of:
   transferring radio parameters and/or configuration data to a memory of the power supply unit,
   inserting the power supply unit into the slot, and
   controlling operation of the transmitter, by the control unit based on the radio parameters and/or configuration data stored in the power supply unit,
   wherein the radio parameters and/or configuration data comprise a time indication,
   and wherein a transmitting operation of the mobile radio device depends on the time indication.

2. The method for operating at least one radio device as set forth in claim 1, wherein
   the time indication comprises at least one of a period of time from said transferring the radio parameters and/or configuration data to the memory of the power supply unit, a certain time and a certain date.

3. The method for operating at least one radio device as set forth in claim 1, wherein
   the control unit controls the transmitter such that the transmitter transmits only in accordance with the time indication and does not transmit until the control unit has received the radio parameters and/or the configuration data from the power supply unit.

4. The method for operating at least one radio device as set forth in claim 1, further comprising a step of:
before said transferring, automatically selecting at least one radio parameter and/or configuration date for the at least one mobile radio device, based on parameters that are specific for a place of operation and that are legally or officially determined by an authority.

5. The method for operating at least one radio device as set forth in claim 1, wherein
the radio parameters and/or configuration data further comprise at least one transmission frequency, at least one transmission frequency range and/or at least one transmission power value.

6. The method for operating at least one radio device as set forth in claim 5, wherein
the radio parameters and/or configuration data comprise a plurality of alternatively usable transmission frequencies, transmission power values or ranges of transmission frequencies or transmission power values, and wherein said controlling the operation of the transmitter comprises selecting a range or a subrange of the plurality of alternatively usable ranges, wherein the selected range or subrange is not modified during a time window according to the time indication, and wherein the transmitter is operated in the selected range or subrange.

7. The method for operating at least one radio device as set forth in claim 6, wherein
the plurality of alternatively usable ranges are transmission frequency ranges.

8. The method for operating at least one radio device as set forth in claim 1, wherein
the power supply unit comprises a real-time clock controlling the operation of the mobile radio device in accordance with the time indication.

9. The method for operating at least one radio device as set forth in claim 1, wherein
the mobile radio device comprises a real-time clock controlling the operation of the mobile radio device in accordance with the time indication.

10. The method for operating at least one radio device as set forth in claim 1, further comprising a step of:
transferring the radio parameters and/or configuration data from a charger to the power supply unit while the power supply unit is placed in the charger and is being charged.

11. A power supply unit for a mobile radio device comprising:
a rewritable memory adapted for storing radio parameters and/or configuration data; and
a rechargeable accumulator,
wherein the radio parameters and/or configuration data comprise a time indication and the radio parameters and/or configuration data further comprise at least one transmission frequency, at least one transmission frequency range and/or at least one transmission power value, and wherein an operation of the mobile radio device depends on the time indication.

12. The power supply unit as set forth in claim 11, wherein
the time indication comprises a period of time from said storing the radio parameters and/or configuration data in the rewritable memory of the power supply unit, a certain time and/or a certain date.

13. The power supply unit as set forth in claim 11, wherein
the power supply unit comprises an electrical connector adapted for writing the radio parameters and/or configuration data to the rewriteable memory and for reading the radio parameters and/or configuration data from the rewriteable memory.

14. A charger for a power supply unit as set forth in claim 11, comprising
at least one charging shaft adapted for connecting to the power supply unit, and
at least one configuration unit adapted for receiving or retrieving, from a memory, radio parameters and/or configuration data, wherein the radio parameters and/or configuration data are transferred to a power supply unit connected to the charging shaft.

15. The charger as set forth in claim 14, wherein
the radio parameters and/or configuration data comprise a time indication, and wherein an operation of the mobile radio device depends on the time indication.

16. The charger as set forth in claim 14, further comprising
an encryption unit adapted for encrypting the radio parameters and/or configuration data received or retrieved from the memory,
wherein the encrypted radio parameters and/or configuration data are transferred to the power supply unit connected to the charging shaft.

17. An audio transmission configuration system, comprising:
at least one mobile radio device that comprises a power supply unit as set forth in claim 11, wherein operation of the at least one mobile radio device is based on the radio parameters and/or configuration parameters stored in the memory of the power supply unit.

18. A charger for a power supply unit as set forth in claim 11, comprising
at least one charging shaft adapted for connecting to the power supply unit, and
at least one configuration unit adapted for receiving, or retrieving from a memory, radio parameters and/or configuration data, wherein the charger is adapted for transferring the radio parameters and/or configuration data to a power supply unit connected to the charging shaft.

19. The charger as set forth in claim 18, further comprising
an encryption unit adapted for encrypting the radio parameters and/or configuration data received or retrieved from the memory,
wherein the encrypted radio parameters and/or configuration data are transferred to and stored in the power supply unit connected to the charging shaft.

20. An audio transmission configuration system, comprising:
at least one mobile radio device that comprises a power supply unit as set forth in claim 11 and a charger as set forth in claim 18, wherein operation of the at least one mobile radio device is based on the radio parameters and/or configuration parameters stored by the charger in the memory of the power supply unit.

21. A power supply unit for a mobile radio device comprising:
a rewritable memory adapted for storing radio parameters and/or configuration data; and
a rechargeable accumulator,
wherein the radio parameters and/or configuration data comprise a time indication that is overwritable by a charger for recharging the rechargeable accumulator, the time indication comprising at least one of a remaining duration at which a transmit operation of the mobile radio device is allowed, a certain time at which a transmit operation of the mobile radio device is allowed and a certain date at which a transmit operation of the mobile radio device is allowed, and wherein a transmit operation of the mobile radio device depends on the time indication.

22. The power supply unit as set forth in claim 21, wherein
the power supply unit comprises an electrical connector adapted for writing the radio parameters and/or configuration data to the rewriteable memory and for reading the radio parameters and/or configuration data from the rewriteable memory.

23. A charger for a power supply unit as set forth in claim 21, comprising:
at least one charging shaft adapted for connecting to the power supply unit, and
at least one configuration unit adapted for receiving, or retrieving from a memory, radio parameters and/or configuration data, wherein the charger is adapted for transferring the radio parameters and/or configuration data to a power supply unit connected to the charging shaft.

24. The charger as set forth in claim 23, further comprising
an encryption unit adapted for encrypting the radio parameters and/or configuration data received or retrieved from the memory,
wherein the encrypted radio parameters and/or configuration data are transferred to and stored in the power supply unit connected to the charging shaft.

25. An audio transmission configuration system, comprising:
at least one mobile radio device that comprises a power supply unit as set forth in claim 21 and a charger as set forth in claim 23, wherein operation of the at least one mobile radio device is based on the radio parameters and/or configuration parameters stored by the charger in the memory of the power supply unit.

* * * * *

UNITED STATES PATENT AND TRADEMARK OFFICE
CERTIFICATE OF CORRECTION

PATENT NO. : 11,026,014 B2
APPLICATION NO. : 16/654127
DATED : June 1, 2021
INVENTOR(S) : Jan Watermann et al.

It is certified that error appears in the above-identified patent and that said Letters Patent is hereby corrected as shown below:

On the Title Page

Item [72], Sebastian Georgi's address to read --Langenhagen-- instead of "Langenhangen"

Item [73], "Sennheiser electronics GmbH & Co. KG" to read --Sennheiser electronic GmbH & Co. KG--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*